United States Patent [19]

O'Brien

[11] Patent Number: 5,681,540
[45] Date of Patent: Oct. 28, 1997

[54] PROCESS FOR THE RECOVERY OF SULFUR FROM A FEED STOCK

[75] Inventor: Robert n. O'Brien, Victoria, Canada

[73] Assignee: R. and O. Ore Processing Ltd., Vancouver, Canada

[21] Appl. No.: 411,766

[22] PCT Filed: Oct. 1, 1993

[86] PCT No.: PCT/CA93/00409

§ 371 Date: May 9, 1995

§ 102(e) Date: May 9, 1995

[87] PCT Pub. No.: WO94/07796

PCT Pub. Date: Apr. 14, 1994

[30] Foreign Application Priority Data

Oct. 1, 1992 [CA] Canada ................... 2079757

[51] Int. Cl.$^6$ ............... C01D 17/02; C01D 17/16
[52] U.S. Cl. ....................... 423/573.1; 423/224
[58] Field of Search .................. 423/224, 573.1

[56] References Cited

U.S. PATENT DOCUMENTS

| | | |
|---|---|---|
| 676,209 | 6/1901 | Strache .................. 423/224 |
| 1,313,370 | 8/1919 | Datta . |
| 1,516,915 | 11/1924 | De Loisy . |
| 2,009,898 | 7/1935 | Morrell . |
| 3,095,725 | 7/1963 | Pierce et al. .......... 423/573.1 |
| 4,693,881 | 9/1987 | Miller .................. 423/573.1 |
| 4,968,502 | 11/1990 | Radel ................... 423/224 |
| 5,147,620 | 9/1992 | Rozsa .................. 423/573.1 |

FOREIGN PATENT DOCUMENTS 28 19 130 11/1978 Germany .

OTHER PUBLICATIONS

N.G. Vilesov et al., "Recovery of sulfur from waste gases containing sulfur dioxide and hydrogen sulfide," p. 141, (see abstract & SU.A.1 111 985 Vilesov).

*Primary Examiner*—Gary P. Straub
*Attorney, Agent, or Firm*—Bell, Seltzer, Park & Gibson, P.A.

[57] ABSTRACT

A process for the recovery of sulfur from a feedstock, such as sour gas, including hydrogen sulfide, in which the feedstock is contacted with an aqueous mixture of ammonium nitrate, sulfuric acid and nitric acid to produce solid sulfur and gaseous hydrogen.

8 Claims, 1 Drawing Sheet

_5,681,540_

PROCESS FOR THE RECOVERY OF SULFUR FROM A FEED STOCK

FIELD OF THE INVENTION

The present invention relates to the recovery of sulfur from a hydrogen sulfide bearing feedstock. The dissociation of hydrogen sulfide into its constituents of hydrogen and sulfur is an important industrial procedure.

BACKGROUND OF THE INVENTION

Sulfur is an important industrial commodity and one important source of sulfur is "sour gas" which is natural gas containing hydrogen sulfide. It is well known to treat hydrogen sulfide removed from "sour gas" in the natural gas fields of North America. Most of the processes to date produce sulfur and water.

Two prior systems are respectively concerned with thermal or electrochemical dissociation. The thermal dissociation process entails raising the temperature to about 1500° C. and looks very clean until recombination is considered. Electrochemical dissociation with the oxidation of sulfide ion at one electrode and hydrogen reduction at the other electrode looks ideal until the coating of the anode with sulfur causes deactivation.

So far as the electrochemical process is concerned there are a number of interesting publications:

U.S. Pat. No. 3,249,522 (Bolmer-1966) discloses a process for electrolyzing liquid hydrogen sulfide to obtain hydrogen at the cathode and sulfur at the anode. It appears that the efficiency drops precipitously as the sulfur coats the anode.

U.S. Pat. No. 3,409,520 (Bolmer-1968) discloses the use of benzene to dissolve any sulfur which is formed, the benzene being recycled. As is known, benzene residuals in sulfur are unacceptable to users of sulfur. Bolmer also suggested using ammonium hydroxide in place of sodium hydroxide to induce ionization of the hydrogen sulfide, but highly corrosive ammonium polysulfides in water result. Industry has determined that such a process is uneconomic at the moment.

Other patents concerned with electrochemical processes are U.S. Pat. No. 3,150,998 (Reitemeir 1964), U.S. Pat. No. 3,266,941 (Johnson-1966) and U.S. Pat. No. No. 4,544,461 (Venkatesoii-1985). However, it is not known how far the practical use of those inventions has proceeded.

One of the first patents in the electrochemical field is believed to have been U.S. Pat. No. 1,891,974 (Fisher-1932) and this disclosed a combination of chemical and electrochemical processes where, by using potassium ferricyanide, the sulfide was oxidized to sulfur and the solution was then electrolyzed to produce hydrogen.

Iron redox chemistry and indirect electrochemical methods are disclosed in U.S Pat. Nos. 4,443,423, 4,443,424, 4,431,714 and 4,540,561 (Olson, 1984 and 1985). Methods using halogens (chlorine, iodine and bromine molecules or ions) as additives in electrochemical processes are in the public domain by way of technical literature as are high temperature electrochemical methods using molten carbonates as electrolyte. A fuel cell that uses hydrogen sulfide as a fuel and produces power plus some unburned hydrogen has been reported.

Turning now to the thermal dissociation of hydrogen sulfide, it will be appreciated that the method is not thermodynamically favorable until temperatures of 1500° C. are reached and exceeded. Some dissociation does occur at lower temperatures but the rates are low and the recombination rates are rapid even in the presence of catalysts for dissociation of hydrogen sulfide. U.S. Pat. No. 3,962,409 (Kotera et al-1976) teaches that a hot stream of hydrogen sulfide (720°–1070° K) passed over molybdenum sulfide, tungsten sulfide or ruthenium sulfide when the product is cooled in a room temperature trap and recirculated so that multiple cycles will reach a maximum conversion of 80%.

Methods of separation of the dissociated hydrogen by pressure swing adsorption, adsorption, effusion and thermal diffusion are to some extent effective. Patents which have issued on these separation methods are as follows:

Japanese Patent No. 7,899,078 (Kameyama et al 1979) discloses that hydrogen-hydrogen sulfide separation using Vycor, silicon trioxide plus silicon nitride membranes is possible. A system using molybdenum sulfide and a separation membrane of alumina or other ceramics is the subject of European Patent Application No. 228,885 (Abe-1987).

Japanese Patent Nos. 80,119,439 and 58,14,809 (Toyobo Co.-1980 and 1983) teach that hollow fibers of glass or ceramic surrounded by molybdenum sulfide particles give a two-fold enrichment of hydrogen from a gas mixture at 1070° K.

Japanese Patent No. 77,52,173 (Hirota-1977) teaches thermal diffusion separation of hydrogen after hot catalyst dissociation of hydrogen sulfide with temperatures in the range of 770° and chromium sulfide as catalyst.

U.S. Pat. No. 4,481,181 (Norman-1984) is concerned with a method whereby in a deficiency of oxygen about ⅓ of the hydrogen sulfide is burned to provide the heat for thermal dissociation of $H_2S$ and a rapid cooling prevents recombination of the hydrogen and sulfur. A similar process in U.S. Pat., No. 4,461,755 (Daley 1984) requires heating to higher temperatures in the range 1255°–2090° and rapid cooling for separation of hydrogen. Another process in German Patent No. 2,915,210 (Hellmer et al-1980) uses cooling in stages to separate hydrogen and uses the heat recovered to heat the input stream.

Thermochemical cycles have been proposed in a number of prior references. In U.S. Pat. No. 2,979,384 (Weiner and Legget-1961) use is made of several metal sulfides at 710° K whereafter scrubbing of the hydrogen sulfide in sodium hydroxide solution takes place to get pure hydrogen, the sulfur being recovered by thermal decomposition at 980° K. Canadian Patent No. 1,134,596 (Behie et al-1982) uses a fluidized bed of metal sulfides on alumina or silica acid operates in two stages: a sulfidation stage producing hydrogen and a thermolysis stage in which elemental sulfur is recovered and the metal sulfide converted back to a reactive form. French Patent No. 2,238,668 (Bogossian- 1975) combines the hydrogen producing and sulfur recovery stages as hydrogen sulfide which is passed through molten metals at very high temperatures to form hydrogen and a decomposable metal sulfide. A process disclosed in Japanese Patent No. 73,28,293 (Kotera et al-1973) uses carbonyl sulfide as the intermediate to allow hydrogen and sulfur to be produced separately. Several patents have issued using iodine to form an intermediate hydrogen compound and sulfur, then hydrogen from the intermediate separately. U.S. Pat. Nos. 4,066,739 (Chen-1978) and 4,094,962 (Cocuzza and Musso-1978), Japanese Patent Nos. 76,02,696 (Nishimoto et al-1976) and 79,16,395 (Kameyama et al 1979) use these intermediates. U.S. Pat. No. 4,592,905 (Plummer-1986) uses anthraquinones to cleave hydrogen sulfide in a two step process at low temperature. A three stage process using intermediates in U.S. Pat. No. 4,432,960 (Herrington and Kuch-1984) involves carbonyl sulfide and carbon dioxide but gives hydrogen and sulfur dioxide rather than sulfur. Japanese Patent No. 78,134,791 (Fukuda et al-1978) uses a reaction of hydrogen sulfide with molten copper or hot copper powder to remove sulfur as a reactant, but produces sulfur dioxide when the copper is recovered. U.S. Pat. No. 4,693,875 (James et al-1987) uses a palladium complex to remove sulfur from the dissociated mixture and sulfur dioxide is recovered.

In the above-mentioned processes it would appear that the hydrogen and sulfur is recovered at relatively high temperatures. This is a substantial disadvantage.

It is an object of the present invention to provide a novel process for producing hydrogen and sulfur in their elemental forms from a feedstock of hydrogen sulfide wherein at least one of disadvantages of the abovementioned processes is avoided.

SUMMARY OF THE INVENTION

According to the present invention there is provided a process for the recovery of sulfur from a feedstock including hydrogen sulfide consisting of the steps of contacting said feedstock with an aqueous mixture comprising 1 to 5M nitric acid and 9 to 12M sulfuric acid to produce at least solid sulfur and recovering the solid sulfur.

More specifically the concentration of the nitric acid is between 1 and 5M, preferably about 3M and the sulfuric acid is between 9 and 12M.

The aqueous mixture may also contain ammonium nitrate, other ammonium salt or a metal amine complex or mixtures thereof.

Advantageously the concentration of ammonium nitrate is about 1.5M, the nitric acid about 3M, sulfuric acid is greater than 10M, and the ammonium salt or complex is approximately 3M.

Optionally any produced hydrogen may be recovered if produced in sufficient quantity.

BRIEF DESCRIPTION OF THE DRAWING

An embodiment of the present invention will now be described, by way of example, with reference to the single FIGURE of the accompanying drawing which is a diagrammatic representation of apparatus for use in the instant process.

DETAILED DESCRIPTION OF THE PREFERRED EMBODIMENTS

Figure 1:
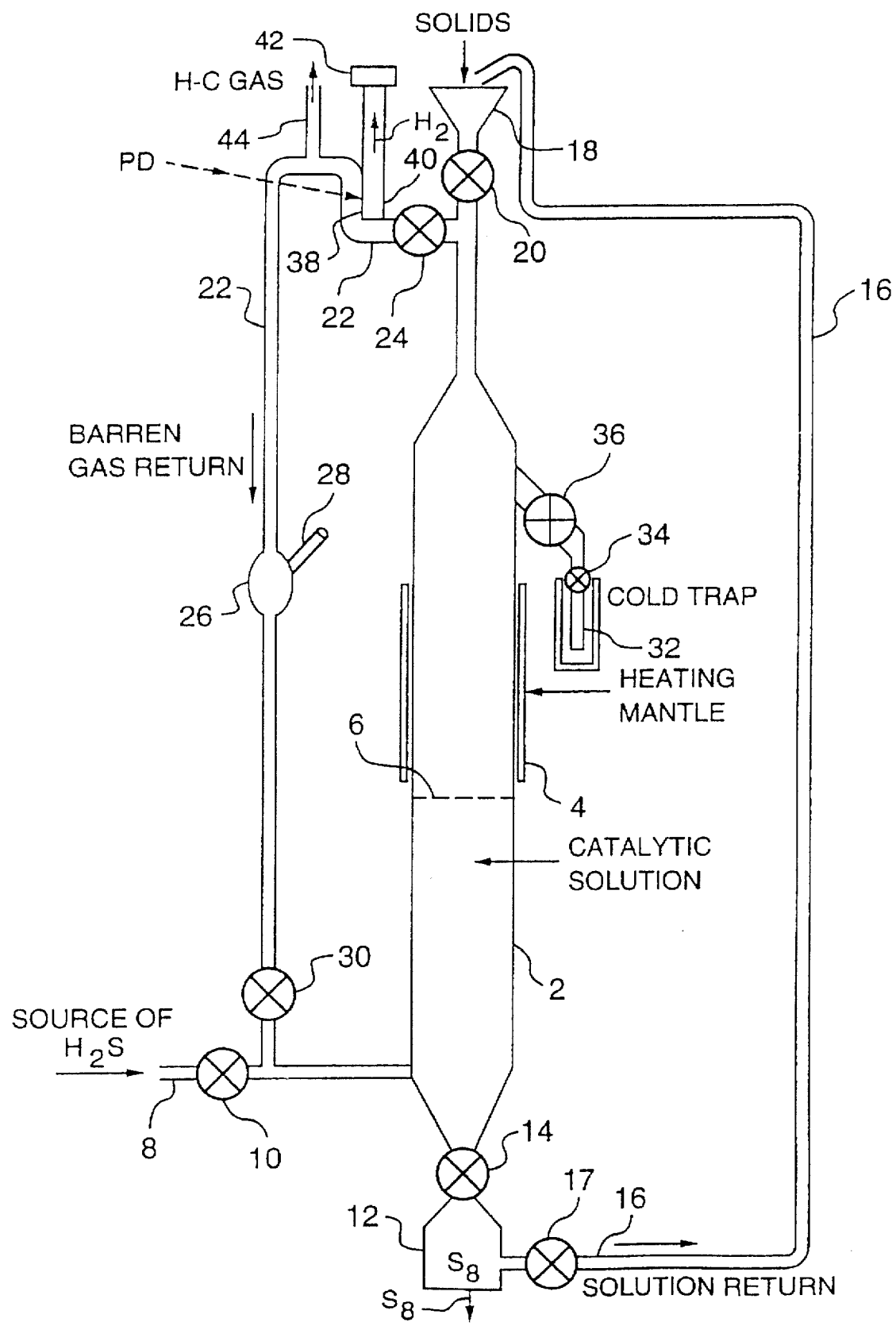

Referring to the FIGURE, a reaction vessel 2 is provided and is constructed of either pyrex glass or steel lined with pyrex glass and is operated at about one atmosphere above ambient pressure. A heating mantle 4 is provided above the level 6 of any solution in the reaction vessel 2. The reaction vessel may be heated to 200° C.–250° C. above the solution.

An inlet tube 8 for a feedstock which includes hydrogen sulfide is provided through a one-way valve 10 to the reaction vessel 2.

A lower collection part 12 is shown in the diagram connected to the main part of the reaction vessel through a valve tube 16 provided through a one-way valve 17 to the top of the reaction vessel, feeding into a funnel portion 18 through a one-way valve unit 20. A barren gas return tube 22 is provided through a one-way valve unit 24, passing through an expansion portion 26 of the tube, said expansion being exposed through tube 28 either to air or, preferably, oxygen. The tube 22 passes through a one-way valve unit 30 and enters the inlet tube 8 on the reaction vessel side of valve unit 10.

A cold trap chamber 32 is connected through valve units 34 and 36 to the upper portion of the reaction vessel 2.

The upper portion of the tube 22 includes a separator 38 of palladium metal whereby hydrogen, as produced by the catalytic reaction, can exit through the separator into a tube 40.

In use, the feedstock comprises hydrogen sulfide and enters the reaction vessel 2. The reaction vessel 2 contains a catalytic solution which is an aqueous mixture comprising nitric acid and sulfuric acid to produce hydrogen gas and solid sulfur and optionally another ammonium salt or metal amine complex. Advantageously the ammonium nitrate has a concentration of between zero and 1.5M, preferably about 1.5M, the nitric acid between 1 and 5M, preferably about 3M, the sulfuric acid has a concentration between 9 and 12M, preferably greater than 10M, and the additional ammonium salt or metal amine complex has a concentration up to 3M (i.e. 0–3M).

Other ammonium salts may include ammonium sulfate, ammonium chloride, ammonium phosphate and any other form of ammonium salt which provides a source of the ammonium ion and does not otherwise interfere with the catalytic process. The metal amine complex may be of the type such as Cu or Co or other transition metal complexed with glycine or other amino acids or polyfunctional amines, such as propylene diamine and higher molecular weight complexing agent.

As a result of the reaction in the reaction vessel, a residue of solid sulfur is produced together with gaseous hydrogen. The solid sulfur ($S_8$) falls to the lower collection part 12 whilst any of the gaseous hydrogen which rises and exits through tube 40 may be retained in a tank 42. The hydrogen may be pumped to the pressure tank 42 and held under pressure.

Some solid sulfur may be deposited in the upper part of the reaction chamber vessel 2 above the upper level 6 of the solution. As it builds up it will slide into the cold trap 32 for removal with the $H_2O$ produced. It may be necessary to heat it to between 200° to 250° C. by way of the heating mantle 4, the sulfur vapor produced flows through the valves 36 and 34 into the cold trap chamber 32 where it is condensed and recovered.

Solid ammonium nitrate is introduced into the reaction vessel 2 by way of the funnel portion 18 whilst the sulfuric acid used is obtained by oxidizing some of the sulfur to sulfuric acid. It will thus be understood that one does not get exactly 100% sulfur out of the process and the strength of the sulfuric acid is kept up so that one has strong sulfuric acid to force the nitric acid to act as a base and to oxidize the sulfur.

Any solid ammonium sulfate formed may be blown down with some solution, the solid is drained and dried and the solution returned to the reaction chamber through tube 16, after purification as necessary. New solution of a suitable quantity and concentration may be added at or near the bottom of the reaction, vessel to maintain the concentration of reactants in the vessel at the desired concentration and to compensate for any oxidation to water and sulfate ion. Any ammonium sulfate in the sulfur may be removed by a water wash and the resulting solution evaporated.

The reaction vessel 2 may be operated at about 1 atmosphere pressure above ambient and the concentration of the reactants may vary, the ammonium nitrate varying between 0 and 1.5M, the nitric acid varying between 1 and 5M, the ammonium salt or amine complex varying between 0 and 3M and the sulfuric acid varying between 9 and 12M.

The feedstock may be any source of hydrogen sulfide or, in some cases, hydrocarbon gas containing hydrogen sulfide.

As mentioned above, the hydrogen produced passes through the hydrogen separating device 38 made of palladium whilst the barren gas continues through the tube 22. The barren gas is exposed to air, or oxygen, so that the return is a mixture of NO and $NO_2$ (mostly $NO_2$).

The hydrogen sulfide or, in the case of a gas containing very small amounts of $H_2S$, comes out near the bottom of the reaction vessel 2, bubbles through the catalytic solution and sulfur drops out and if there is any hydrogen, it will be taken out above the reaction vessel through pipe 40. If the feedstock is slightly sour gas, no recycling of gas occurs, the NO remaining in the stream scavenges any $O_2$ or free radicals.

When the hydrogen sulfide comes in, it gets oxidized to sulfur and some water and some hydrogen, possibly. The gases bubble up through the catalytic solution restoring the catalytic solution as they are produced. They go out through the top of the reaction vessel 2 and small amounts of ammonium nitrate are added to make up for what is bled off with the gases. It is anticipated that some of the sulfur as it goes down the reaction vessel will be wet with the solution.

The sulfur component in the hydrogen sulfide coming in, will be oxidized by the catalytic solution which is a mixture of sulfuric acid, nitric acid and preferably ammonium nitrate. Any hydrogen gas remaining at the top passes through the palladium separator 38. The cold trap traps off any gases or vapors such as $H_2O$ and S. Pellets of amorphous sulfur may build up, floating on the surface 6 of the reaction mixture until they pass down to the cold trap. Heating may be required to remove any sulfur sticking to the sides of reaction vessel 2.

As the gas stream coming off goes past the palladium separator 38, any hydrogen in the stream at this point goes out through tube 40 and the barren solution passes down tube 22 and is oxidized back up to nitric acid, actually $NO_2$, in the chamber 26. This joins the hydrogen sulfide stream and goes again into the catalytic solution. The $NO_2$ is absorbed and disproportionates into $HNO_3$ and $HNO_2$, the NO is either oxidized to $NO_2$ or absorbed as $HNO_2$.

The operation above is under a minor amount of pressure, a couple of inches of water up to 1 atmosphere as required for recirculation.

The process continues to recirculate and the $NO_2$ dissolving in the catalytic solution gives back nitric acid and nitrous acid from the NO and then the gas coming off goes around again and gets oxidized by the air or oxygen in chamber 26. The water vapor gets trapped out in the cold trap which may require addition of small amounts of ammonium nitrate and small amounts of sulfuric acid to make up the catalytic mixture. The make-up of ammonium nitrate may be, instead, with nitric acid. An ammonium salt or a metal complex ion such as zinc amino sulfate, cupric amino sulfate, etc. will buffer the ammonium ion concentration.

It will be readily apparent to a person skilled in the art that a number of variations and modifications can be made without departing from the spirit of the invention as defined by the appended claims.

I claim:

1. A process for the recovery of sulfur from a gaseous feedstock comprising hydrogen sulfide, said process comprising the steps of:

i) introducing said gaseous feedstock into an aqueous mixture comprising 1 to 5M of nitric acid and 9 to 12M sulfuric acid to produce solid sulfur from the hydrogen sulfide in said gaseous mixture; and ii) recovering the solid sulfur from said aqueous mixture.

2. A process according to claim 1 wherein the aqueous mixture additionally comprises ammonium ions.

3. A process according to claim 2 wherein the ammonium ions are provided by adding a metal amine complex.

4. A process according to claim 2 wherein the ammonium ions are provided by adding ammonium nitrate up to about 1.5M.

5. A process according to claim 4 wherein the concentration of ammonium nitrate is about 1.5M, the nitric acid about 3M, and the sulfuric is greater than 10M.

6. A process according to claim 4 wherein the feedstock is hydrocarbon gas containing hydrogen sulfide.

7. A process according to claim 5 which is operated at a pressure of one atmosphere above ambient pressure.

8. A process according to claim 1 a wherein the upper part of said reaction vessel above said aqueous mixture is heated to 200° to 250° C. to melt any solid sulfur.

* * * * *